United States Patent
Nakajima et al.

(10) Patent No.: US 6,332,102 B1
(45) Date of Patent: Dec. 18, 2001

(54) ROBOT CONTROLLER

(75) Inventors: Hiroshi Nakajima, Itami; Shigeru Shimogama, Kawanishi, both of (JP)

(73) Assignee: Matsushita, Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/287,182

(22) Filed: Apr. 6, 1999

(30) Foreign Application Priority Data

Apr. 7, 1998 (JP) .................................. 10-094328

(51) Int. Cl.⁷ ................................. G06F 19/00

(52) U.S. Cl. .................... 700/245; 700/246; 700/247; 700/248; 700/249; 318/568.11; 318/568.19; 701/23; 414/4

(58) Field of Search ......................... 700/245, 264, 700/250, 252, 56, 757, 86, 247, 248, 249, 259, 251; 901/5, 9, 15, 41, 16; 318/568.25, 568.1, 568.19, 568.11, 568.14, 568.24; 701/23; 414/4

(56) References Cited

U.S. PATENT DOCUMENTS 4,757,459  7/1988  Lauchnor et al. .
4,835,730 * 5/1989  Shimano et al. ............... 700/257

(List continued on next page.)

FOREIGN PATENT DOCUMENTS

| 60-71180 | 4/1985 | (JP) . |
| 3-98780 | 4/1991 | (JP) . |
| 4-24106 | 2/1992 | (JP) . |
| 5-318358 | 12/1993 | (JP) . |
| 6-39761 | 2/1994 | (JP) . |
| 6-254781 | 9/1994 | (JP) . |
| 407175512A * | 7/1995 | (JP) . |

OTHER PUBLICATIONS

White et al., A Graphics Simulator for a Robotic Arm, IEEE., pp. 417–429, 1989.*
Simon et al., Computer–Aided Design of a Generic Robot Controller Hndling Reactivity and Real–Time Control Issues, IEEE., pp. 213–229, 1993.*
Troncy et al., Modular Robots—Graphicl Interactive Programming, IEEE., pp. 1739–1742, 1988.*
Pires et al., Running an Industrial Robot from a typical Personal Computer, IEEE., pp. 267–270, 1998.*
Hong et al., Six–Joints Industrial Robot Controller Software Systen, IEEE., pp. 182–185, 1993.*
Ingimarson et al., A Multiprocessor Based Robot Controlled—A Chimera II Application, IEEE., pp. 1081–1084, 1993.*
West et al., Forth–83 Controller For A Pick–And–Place Robot, IEEE., pp. 129–133, 1989.*
Tzen et al, Issues on the Architecture and the Design of Distributed Shared Memory Systems, IEEE., pp. 60–61, 1996.*
Brantmark, Man/Machine Communication in ASEA'a New Robot Controller, ASEA Journal, pp. 145–150, 1982.*

*Primary Examiner*—William A. Cuchlinski, Jr.
*Assistant Examiner*—McDieunel Marc
(74) *Attorney, Agent, or Firm*—Wenderoth, Lind & Ponack, L.L.P.

(57) ABSTRACT

A robot control apparatus has keys for input/output control and an execution key for permitting execution therefor. A key can be allocated for a reservation sequence stored beforehand. When an operation program is taught for a robot, the reservation sequence allocated to the key can be executed when the key is pressed while the execution is pressed. Then, an operation program can be programmed more correctly by controlling the robot, and time for programming a sequence program is shortened. Execution of an input/output operation due to unintentional or erroneous operation is prevented. Two input/output control sequences can be allocated to one key.

14 Claims, 7 Drawing Sheets

U.S. PATENT DOCUMENTS

| | | | | |
|---|---|---|---|---|
| 4,912,650 | * | 3/1990 | Tanaka et al. | 700/264 |
| 5,038,089 | * | 8/1991 | Szakaly | 701/23 |
| 5,051,676 | * | 9/1991 | Seki et al. | 318/568.24 |
| 5,274,750 | | 12/1993 | Shiina et al. | |
| 5,379,382 | * | 1/1995 | Work et al. | 710/63 |
| 5,555,179 | * | 9/1996 | Koyama et al. | 700/95 |
| 5,841,959 | * | 11/1998 | Guiremand | 345/440 |
| 6,031,973 | * | 2/2000 | Gomi et al. | 700/245 |
| 6,134,102 | * | 10/2000 | Wörn et al. | 361/680 |
| 6,167,328 | * | 12/2000 | Takaoka et al. | 700/264 |

* cited by examiner

ROBOT CONTROLLER

BACKGROUND OF THE INVENTION

1. Field of the Invention

The present invention relates to a robot controller that deals with input/output signals for a hand, an external jig, or the like, of a robot.

2. Description of Prior Art

An apparatus for programming an operation program for a robot has a plurality of keys for operation, and each of the keys is used to control only one output. When a series of input/output controls (input/output control sequence) is executed while an operation program for the robot is being programmed into the apparatus, a list of input/output control commands stored in the apparatus is displayed in a display device, and a control command is selected from among them. Then, a key for instructing input/output control is pressed to execute the input/output control. That is, in the above-mentioned apparatus, a user has to perform a plurality of operations that include: (A) viewing a displayed list of input/output control commands to be stored; and (B) selecting an input/output control command from among the reviewed list.

Alternatively, if a plurality of keys for instructing input/output controls are provided in the apparatus, a user has to press a plurality of keys, to which outputs are allocated, in a predetermined procedure. Then, a user has to remember the contents of the input/output control allocated to each of the keys, or has to make a note thereof.

The content of the input/output control sequence to be executed is displayed in the display device. However, in order to determine whether the entire sequence has been executed, a user has to remember the sequences, or has to make a note thereof. Further, though the content of a robot operating program that is being programmed into the apparatus is usually displayed in the display device, the display does not indicate whether the displayed information is the input/output sequence to be executed, or whether the displayed information is the content of the programming of the apparatus.

In the introduction of a robot into a production line, it is a goal to shorten the programming time. However, as the number of the input/output control commands for a robot becomes larger, and the system becomes larger, time needed for operation of the input/output control becomes much longer. Further, it takes a long time for recovery from an erroneous operation by a user.

Further, in the above-described robot controller, an input/output control is performed by pressing only one key. Therefore, an erroneous operation by a user is liable to start an unintentional operation. For example, for a robot for moving an article, an erroneous operation by a user is liable to cause the robot to drop and damage an article.

SUMMARY OF THE INVENTION

An object of the invention is to provide a robot controller which has a decreased programming time.

Another object of the invention is to provide a robot controller which can prevent execution of input/output control due to an unintentional operation by a user.

A further object of the invention is to provide a robot controller which can confirm functions of keys, and the state of input/output control, while being programmed with an operation program of a robot.

In one aspect of the invention, a robot control apparatus comprises an input/output device which communicates input/output signals with a robot, a teaching device, for teaching an operation program, comprising a plurality of first keys each for instructing an input/output control performed through said input/output device and a second key for performing a series of input/output controls instructed by said plurality of first keys, and a controller which controls the robot through said input/output device according to the operation program for the robot. Thus, a series of input/output controls can be performed with one key operation.

Preferably, the robot controller further comprises an allocator which allocates the series of input/output controls to the second key.

Preferably, in the robot controller, the teaching device further comprises a third key which permits operation of the input/output device, and the controller performs the series of input/output controls only when the second key is pressed at the same time as the third key while the operation program is programmed. Then, because a series of input/output controls is performed by pressing the two keys at the same time, execution of the input/output controls due to an unintentional or erroneous operation can be prevented.

Preferably, in the robot controller, the teaching device further comprises a display device and a storage device that stores a character array allocated to the second key. The display device displays the character array when only the second key is pressed while the operation program is taught. Then, the content of the comment on the input/output control sequence to be executed can be confirmed with the display device by only pressing a key.

Preferably, in the robot controller, the teaching device further comprises a lighting device for the second key. The teaching device turns on the lighting device when the series of input/output controls allocated to the second key is completed after the second key is pressed by a user while the operation program is programmed. Then, execution of the input/output control sequence can be decided uniquely by lighting a lighting device, and user burden can be decreased.

The robot controller further comprises a storage device which stores data corresponding to the input/output controls allocated to the second key or data of the character array, and a cell provided for backup of the data in the storage device while a control power supply of the robot controller is turned off.

In a second aspect of the invention, the teaching device of the robot controller comprises a plurality of second keys.

Preferably, the robot control apparatus comprises an allocator operable to allocate one of the series of input/output controls to one of the second keys.

Preferably, in the robot controller, the teaching device further comprises a third key which permits operation of the input/output device, and the controller performs the series of input/output controls only when one of the second keys is pressed at the same time as the third key while the operation program is programmed.

Preferably, in the robot controller, the teaching device further comprises a display device and a storage device operable to store a character array for each of the second keys, wherein the teaching device displays the character array for one of the second keys in the display device when only one of the second keys is pressed while the operation program is programmed.

Preferably, in the robot controller, the teaching device further comprises a lighting device for each of the second keys. The teaching device turns on the lighting device for one of the second keys when one of the series of input/output controls for the corresponding one of the second keys is completed after the corresponding one of the second keys is pressed by a user while the operation program is programmed.

In a third aspect of the invention, in the robot controller, the teaching device further comprises a fourth key for allocating two series of input/output controls for the second key, and a lighting device for the second key. The controller executes a first series of the two series of input/output controls when the second key is pressed while the operation program for the robot is programmed, and turns on the lighting device when the execution of the first series is completed. Further, it executes a second series of the two series when the second key is operated while the lighting device is lighted, and turns off the lighting device when the execution of the second series is completed. Then, it is possible to allocate two input/output control sequences for one key, and many input/output sequence can be achieved.

Preferably, the robot controller further comprises a storage device which stores data on the two series of input/output controls, and a cell provided for backup of the data in the storage device while a control power supply of the robot controller is turned off. Then, it is not necessary to repeat teaching each time the control power supply is turned on, which is convenient for a user.

An advantage of the present invention is that a series of input/output controls can be performed with one key operation.

Another advantage of the present invention is that time for teaching an operation program for a robot can be shortened.

BRIEF DESCRIPTION OF THE DRAWINGS

These and other objects and features of the present invention will become clear from the following description taken in conjunction with the preferred embodiments thereof with reference to the accompanying drawings, and in which.

DETAILED DESCRIPTION OF THE PREFERRED EMBODIMENTS

Figure 1:
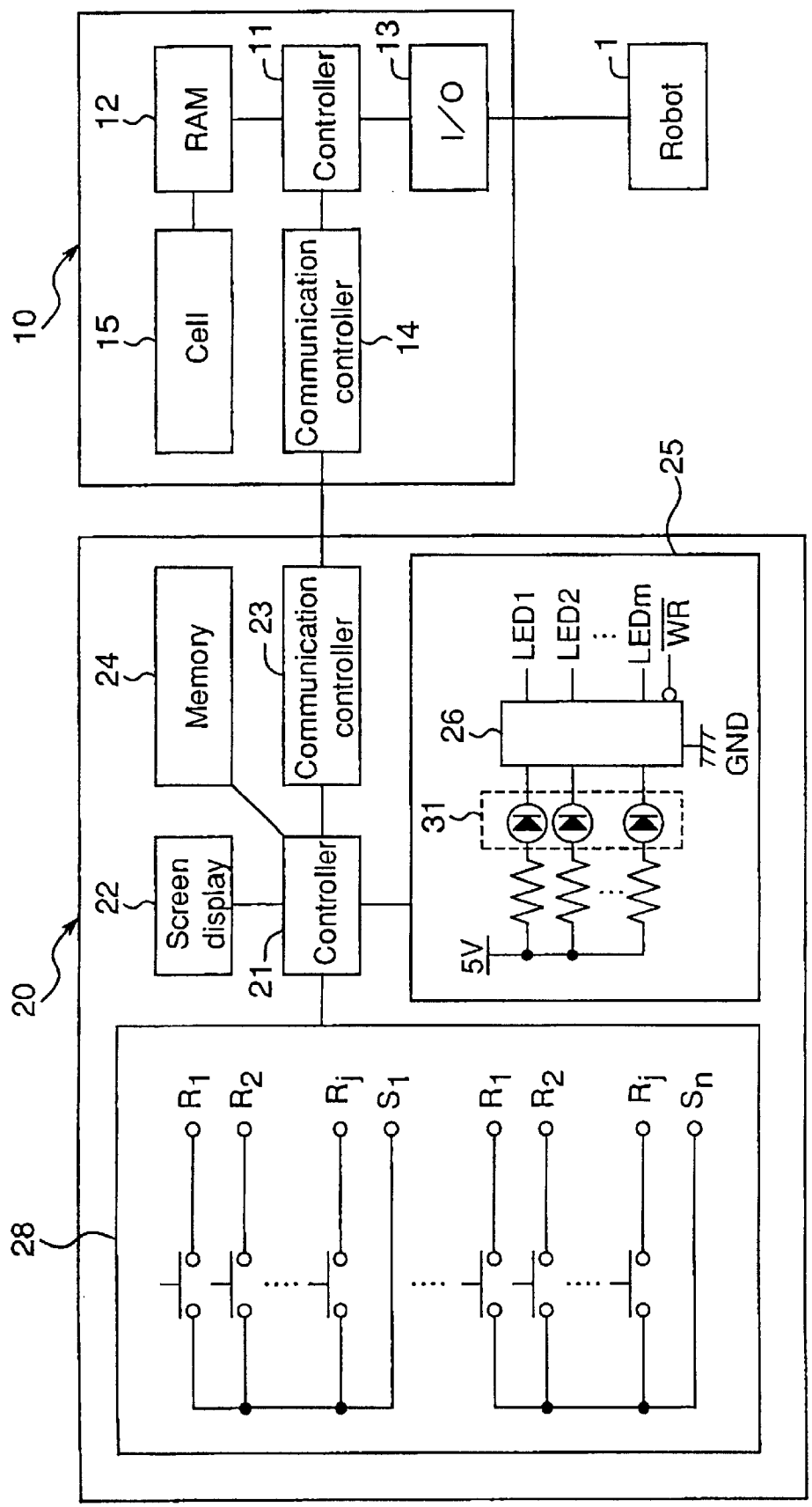
FIG. 1 is a block diagram of a robot controller.

Referring now to the drawings, wherein like reference characters designate like or corresponding parts throughout the several views, FIG. 1 is a block diagram of a robot controller 10 for controlling a robot 1. The robot controller 10 has a controller 11 including a central processing unit for controlling the robot controller 10. It further comprises an input/output (I/O) section 13 as an input/output control means, and a random access memory device (RAM) 12. The input/output section 13 receives data from, or transmits data to, at least a hand, or the like, or external equipment, such as a jig attached to the robot 1. A cell 15 is provided for backup of the data in the RAM 12. Further, the robot controller 10 is connected with a teaching pendant 20 through a communication controller 14 for communicating signals therewith.

The teaching pendant 20 is used by a user for programming an operation program, wherein the operation program is to be performed by the robot 1. The teaching pendant 20 has a controller 21, which includes a central processing unit for controlling the teaching pendant 20. The teaching pendant 20 further includes a screen display device 22, a communication controller 23 for the communication with the main body of the robot controller 10, a memory device 24, and a key section 28 for input/output control for the robot 1. Keys in the key section 28 are arranged as a matrix of j lines and n columns. The controller 11 has a function for allocating functions to the keys through the controller 21 and the communication controllers 23 and 14. It also has a function for recognizing the state of each key in the key section 28 therethrough.

Figure 2:
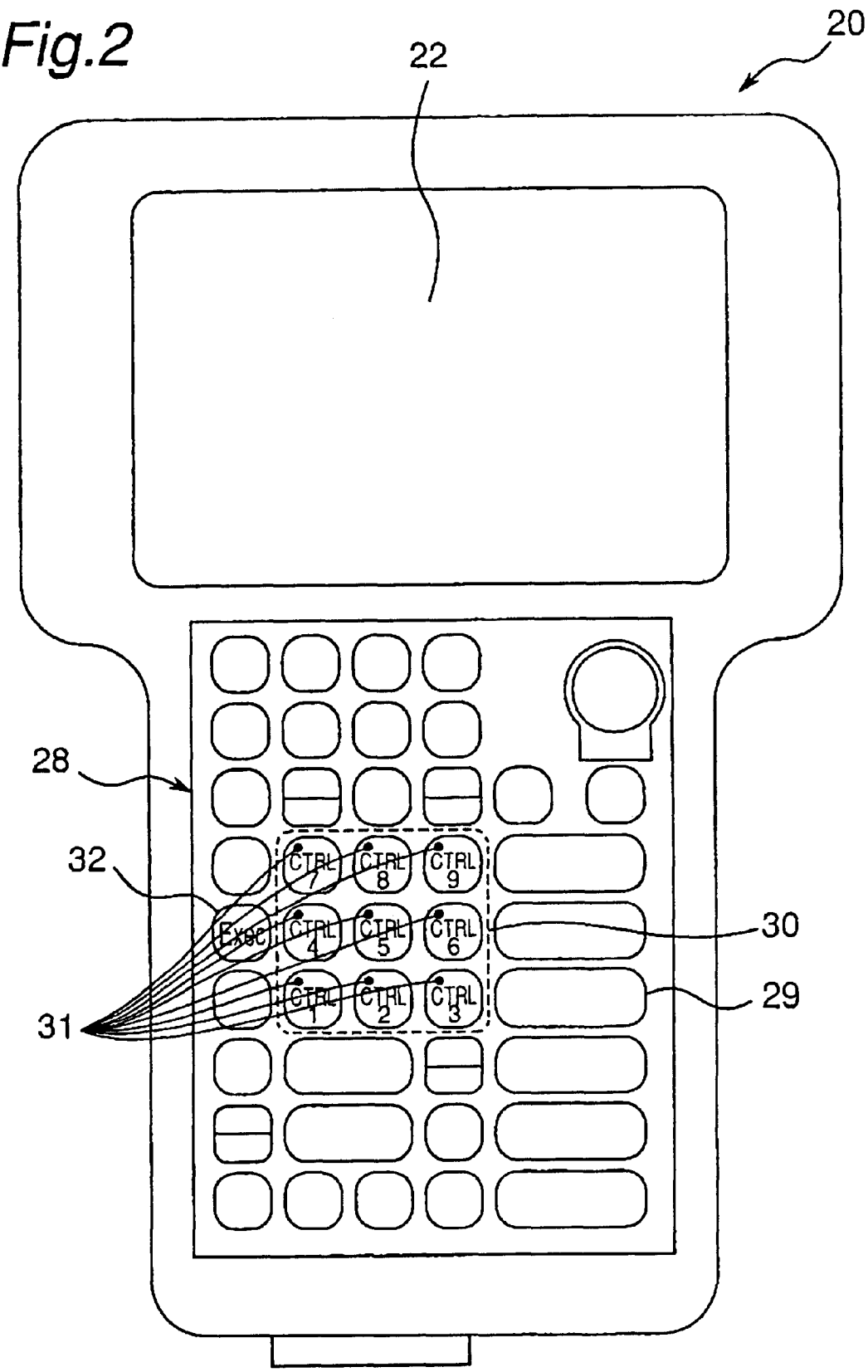
FIG. 2 is a plan view of a teaching pendant.

FIG. 2 shows the teaching pendant 20. The key section 28 has keys 29 for programming input/output controls, keys 30 of CTRL1 to CTRL9 (hereinafter referred to as CTRL keys) for allocating and executing input/output controls, and a key 32 for permitting the execution of input/output controls. They are represented as a whole as 28 in FIG. 1. When a program is programmed into teaching pendant 20, it is sometimes necessary to control a tool, such as a hand attached to a robot. Furthermore, sometimes by controlling a tool, such as a hand attached to a robot, the program being programmed into the teaching pendant 20 becomes more correct. The nine CTRL keys 30 can control inputs/outputs while a program is being programmed into teaching pendant 20. A light emitting diode (LED) 31 is provided for each of the CTRL keys 30 in the teaching pendant 20. Further, the controller 11 stores input/output control sequences received through the teaching pendant 20 in the RAM 12. The controller 11 also allocates the input/output control sequences that are stored in the RAM 12 to the respective CTRL keys 30, and stores such allocations in the RAM 12. An operation program can be programmed into the teaching pendant 20 more correctly by controlling the robot with the CTRL keys 30. Then, time for programming a sequence of programmed actions of the robot can be decreased.

Figure 3:
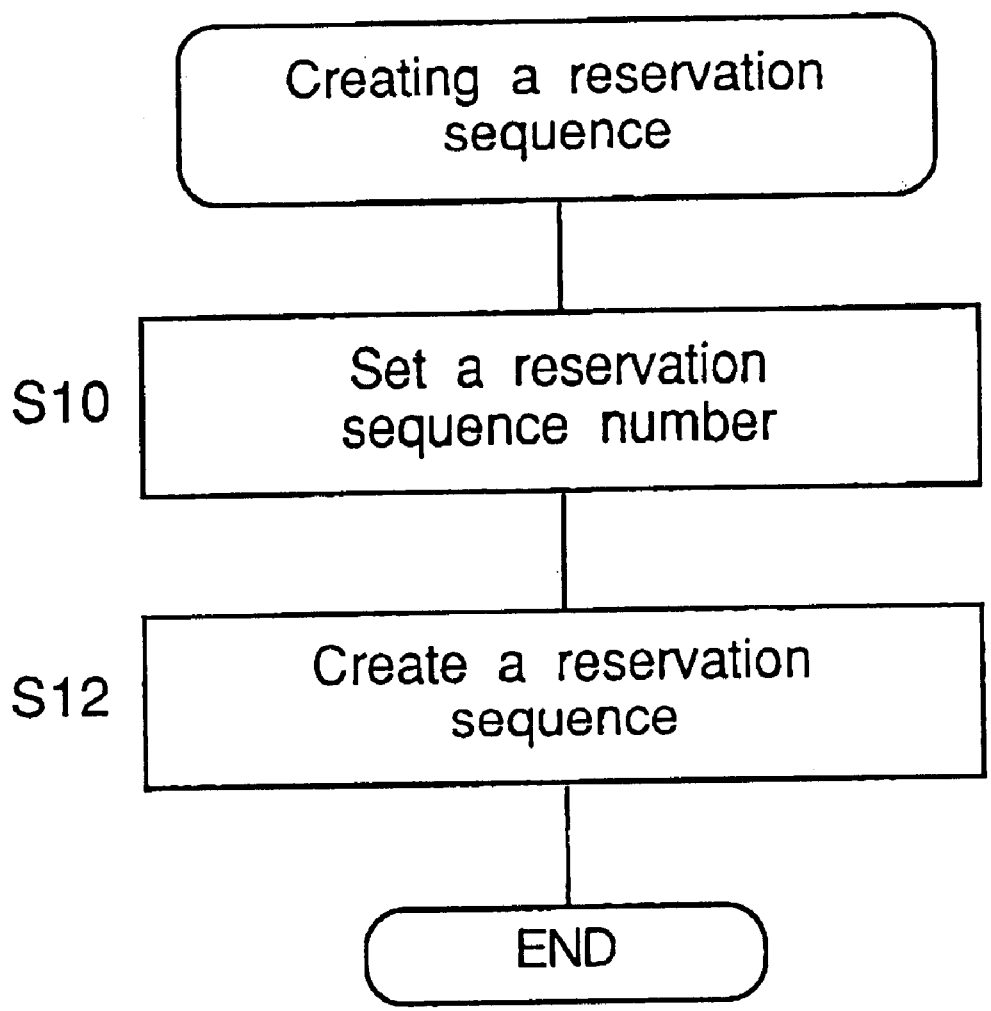
FIG. 3 is a flowchart illustrating the creation of a reservation sequence.

The controller 11 controls the robot controller 10. Some of the controls performed with the teaching pendant 20 operated by a user are explained below with reference to following flowcharts. FIG. 3 is a flowchart dealing with creation of a reservation sequence. When creation of a reservation sequence is selected in the initial screen in the screen display 22, the number of the reservation sequence is set by a user (step S10). Next, a reservation sequence is created and registered for that number (step S12). A sequence consisting of a sequence of commands is created by a known procedure with the teaching pendant 20, and the procedure is not explained here.

Figure 4:
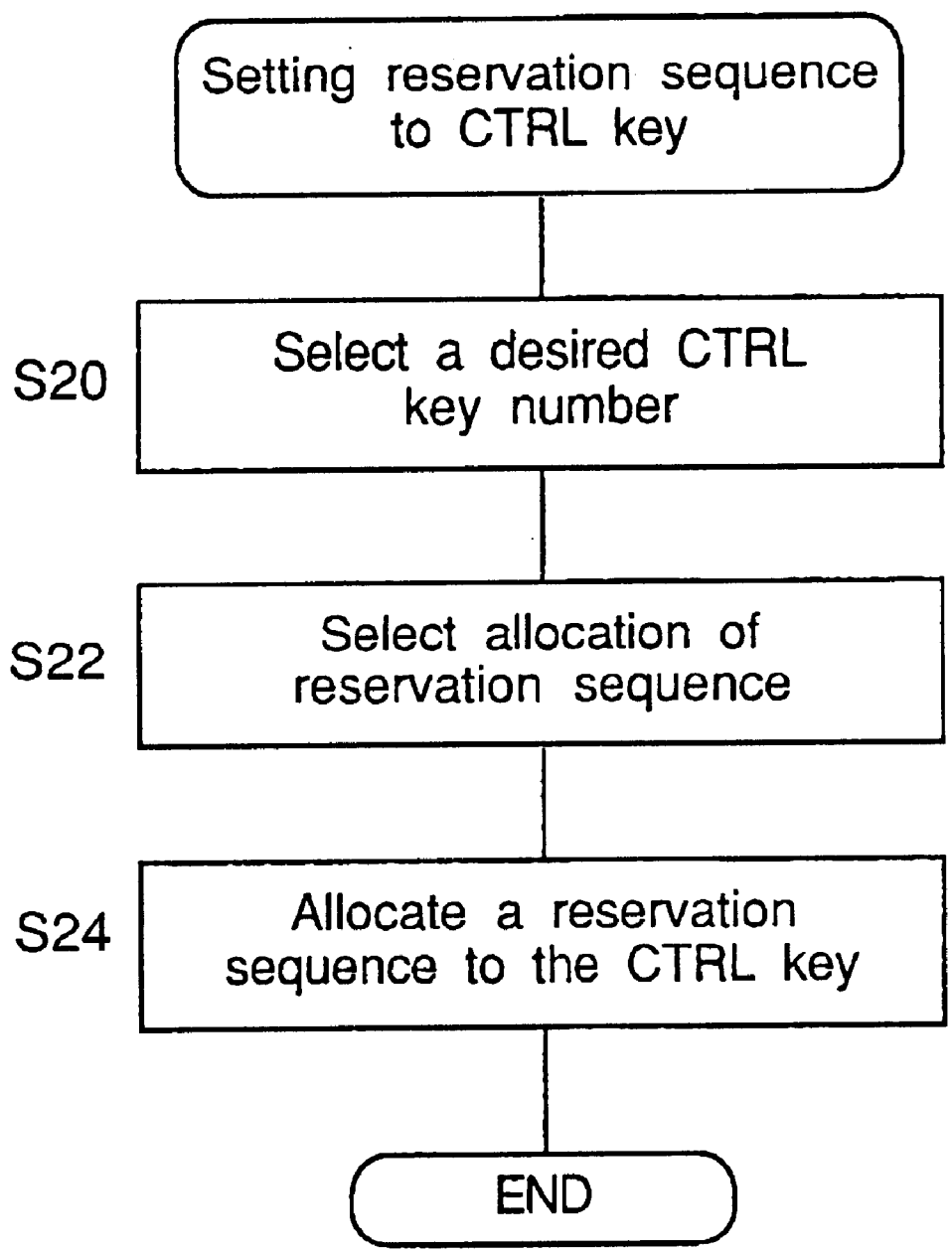
FIG. 4 is a flowchart illustrating the allocation of a reservation sequence to a CTRL key.

FIG. 4 is a flowchart dealing with allocation of a reservation sequence to a CTRL key. When allocation of a reservation sequence to a CTRL key 30 is selected in the initial screen in the screen display 22, a desired number of the CTRL key 30 is selected (step S20). Next, allocation of a reservation sequence to the CTRL key 30 is selected (step S22). Alternatively, an individual input/output control, that is already known, can also be allocated at this step. However, this is not explained here. Next, a desired reservation sequence stored in the RAM 12 is allocated to the CTRL key (step S24).

Figure 5:
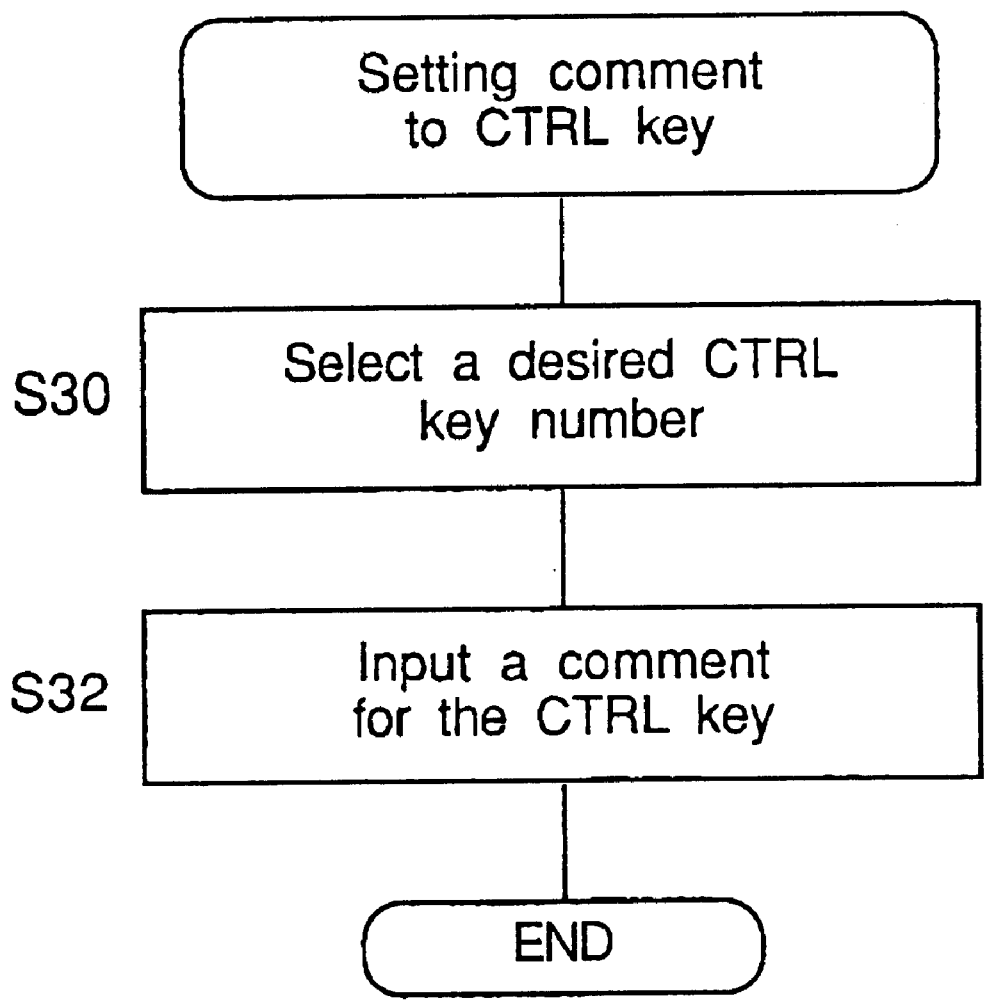
FIG. 5 is a flowchart illustrating the procedure of setting a comment to a CTRL key.

FIG. 5 is a flowchart dealing with setting a comment to a CTRL key. When setting a comment to a CTRL key 30 is selected in the initial screen in the screen display 22, the number of a desired CTRL key 30 is selected (step S30). Next, a comment consisting of an array of characters for the selected CTRL key 30 is inputted by selecting characters displayed in the screen display, and the comment is stored in the RAM 12 (step S32).

Figure 6:
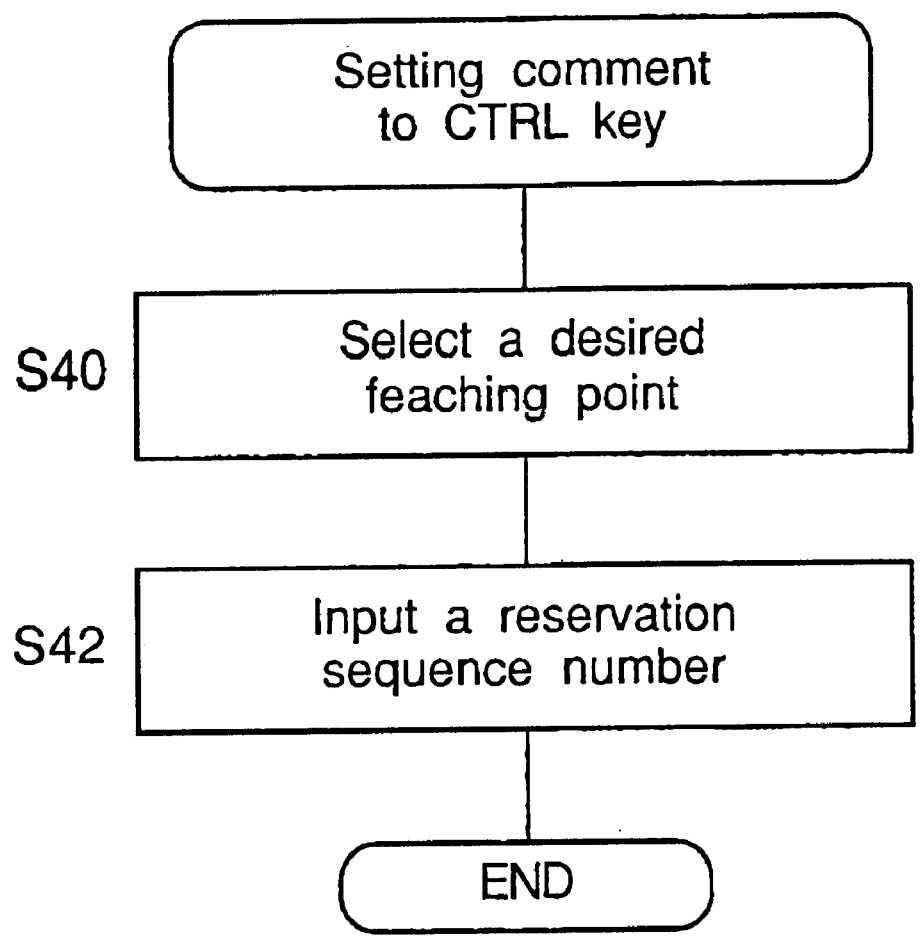
FIG. 6 is a flowchart illustrating the storage of a reservation sequence to a teaching point.

FIG. 6 is a flowchart dealing with storing a reservation sequence at a teaching point. When storing a reservation sequence to a teaching point is selected in the initial screen in the screen display 22, a desired teaching point is selected (step S40). Next, a desired reservation sequence number for the selected teaching point is inputted (step S42). Thus, the reservation sequence at the teaching point is stored in the RAM 12.

A user can execute input/output controls as will be explained below. The user operates the teaching pendant 20 beforehand to create an input/output control sequence, or a reservation sequence, and to store such a sequence in the RAM 12. The user allocates the input/output control sequence stored in the RAM 12 to a CTRL key 30. While a user programs the teaching pendant 20 with an operation program, the user presses one of the CTRL keys 30. The controller 11 is notified of the CTRL key 30 through communication from the teaching pendant 20. The controller 11 then sets an input/output control sequence to be executed for the CTRL key 30 according to its allocation information and the respective input/output control stored in the RAM 12. The controller 11 then controls the signal input/output section 13 according to the content of the selected input/output control sequence. As will be understood from the above-mentioned explanation, a user can perform a series of input/output controls by operating one key.

As explained above, as shown in FIG. 2, the execution key 32 is provided in the teaching pendant 20 for permitting execution of input/output controls. The controller 10 shown in FIG. 1 recognizes the state of the execution key 32 through the communication controllers 14 and 23 and the controller 21.

A user can hold the teaching pendant 20 with two hands. The execution key 32 can be pressed with the thumb of the left hand, while one of the CTRL keys 30 can be pressed with the thumb of the right hand. While programming an operation program into the teaching pendant 20, when the user presses the execution key 32, the controller 11 receives a notification thereof from the teaching pendant 20. Similarly, when the user releases the execution key 32, the controller 11 receives a notification thereof. As such, the controller 11 can determine whether the execution key 32 is pressed.

Further, when one of the CTRL keys 30 is pressed, the controller 11 determines the status of the execution key 32. The controller 11 then selects an input/output control sequence to be executed according to the allocation information of the respective CTRL key 30 that is pressed and the corresponding input/output control stored in the RAM 12. The controller 11 then controls the signal input/output section 13 according to the content of the selected input/output control sequence. Then, the input/output control sequence can be performed by pressing one of the CTRL keys 30 while pressing the execution key 32.

However, if two or more of the CTRL keys 30 are pressed at the same time, the key operation is ignored, and the corresponding combined input/output control sequences are not executed. Further, when the user presses a CTRL key 30 unintentionally, or when the execution key 32 is pressed after one of the CTRL keys 30 is pressed, the input/output control is not performed. Therefore, input/output controls are not performed, for example, when one of the CTRL keys 30 is pressed erroneously in order to operate a key other than the CTRL keys 30, or when the user unconsciously presses one of the CTRL keys 30.

As explained above, an input/output control sequence is performed by pressing two keys at the same time. Then, execution of input/output control due to an unintentional or erroneous operation can be prevented. Thus, the operation is safe.

Figure 7:
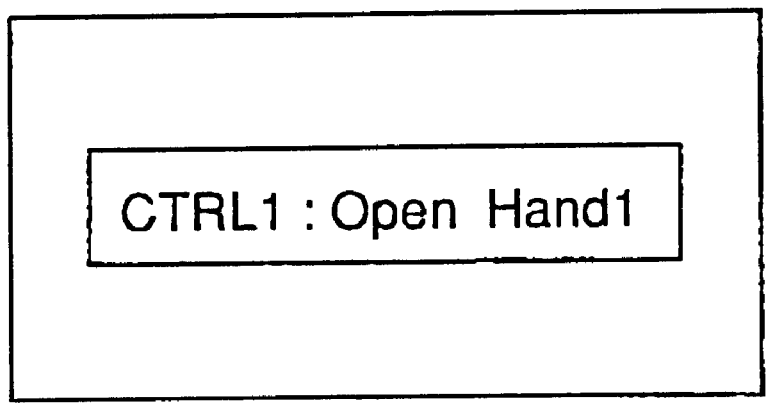
FIG. 7 is a diagram of an array of characters for CTRL 1 key in a display device.

By operating the teaching pendant 20, the controller 11 stores a comment consisting of a character array to be displayed with the display device 22 in the RAM 12, and allocates a respective character array for each of the CTRL keys 30 (FIG. 5). The allocations are also stored in the RAM 12. Further, the controller 11 decides the state of the execution key 32 when one of the CTRL keys 30 is pressed, while an operation program is being programmed into the teaching pendant 20. The controller 11 then selects a corresponding character array according to the allocation information on the pressed CTRL key 30 and the corresponding character array stored in the RAM 12, only when the execution key is not pressed. The controller then displays the character array in the screen display device 22. FIG. 7 shows an example of a screen of the display device 22 when only the CTRL1 key 30 is pressed in the above state. In this example, it is observed that operation of "Open Hand1" is allocated to CTRL1 key.

As explained above, the content of execution can be confirmed only by pressing one of the CTRL keys 30 while the operation program is being programed into the teaching pendant 20, and only after the character arrays corresponding to the content of the input/output control sequence allocated to the respective CTRL keys 30 have been stored beforehand for each of the CTRL keys 30 by the user. Therefore, after the content to be executed is confirmed, the input/output control can be performed by pressing the execution key 32 and the corresponding CTRL key 30. Then, the user can confirm simply the content to be executed for each of the CTRL keys 30 and can execute the input/output control readily after confirmation. An erroneous operation can therefore be prevented.

As shown in FIG. 2, light emitting diodes (LED) 31, of the light emitting diode device 25, are allocated to respective CTRL keys 30 in the teaching pendant 20. Further, the controller 11 turns on or off the LEDs 31 through the communication controllers 14, 23 and the controller 21. After the controller 21 sets data through data buses LED1, LED2, . . . , LEDm connected through a bus (not shown) in a latch circuit 26, it sets a write signal WR (negative logic signal) to a low level as a one shot signal to turn on or off the corresponding LED 31. Further, the controller 11 turns on the corresponding LED 31 when the execution of the input/output control sequence stored in the RAM 12 is completed.

As explained above, by observing the lighting of the LED 31, a user can easily determine whether the execution of the input/output control sequence is completed when a CTRL key 30 (and the execution key 32) are operated for the execution of the input/output control sequence.

Previously, the user would have had to remember the content of the input/output sequence, confirm the input/output state, and estimate the completion of the processing. However, in a system in accordance with the present invention, no such incorrect estimation by a user is needed.

Therefore, a system in accordance with the present invention decreases user burden.

In a modified embodiment of the invention, the controller 11 allocates respective first and second input/output control sequences that are stored in the RAM 12 beforehand for each of the CTRL keys 30, and stores such allocations in the RAM 12. Further, it also stores the on/off states of the LEDs 31 in the RAM 12. In the flowchart shown in FIG. 9, a reservation sequence is allocated to a CTRL key. In this embodiment, when a reservation sequence stored in the RAM 12 is allocated to the CTRL key, it is also specified whether the reservation sequence is executed when the LED for the CTRL key is turned on or off. The sequence for the LED that is turned off is performed first.

When the input/output sequence allocated to the CTRL key is executed, the controller 11 executes the first allocated input/output control sequence if the LED 31 for the CTRL key 30 is determined to be off according to the state of LED stored in the RAM 12. Next, the controller 11 executes the second allocated input/output control sequence if the LED is determined to be on according to the state of LED stored in the RAM 12. Further, the controller 11 reverses the on/off state of the corresponding LED 31 and stores the state to the RAM 12 when the execution of the input/output control is determined to be completed.

As explained above, if an input/output control sequence for opening a hand attached at the top of a robot and an input/output control sequence for closing the hand are included, the user can allocate the two input/output control sequences for a single CTRL key 30. Then, while the operation program is programmed, the hand can be opened and closed with one CTRL key. That is, one CTRL key 30 is correlated to the operation of the hand. In this example, the turning on of the LED 31 in correspondence to the CTRL key 30 is correlated to the opening of the hand, and turning off thereof is correlated to the closing of the hand. In other words, it is possible to allocate a group of two input/output control sequences for one key for instructing input/output controls. Then, many input/output sequences can be dealt.

Then, if a plurality of end effectors can be mounted to one robot by using a tool changer, or the like, and if the control sequence is different for each end effector, the resources (number) of the CTRL keys can be used effectively.

As shown in FIG. 1, the cell 15 is provided for backup of the data in the RAM 12. Then, all data stored in the RAM 12 can be retained even when the power supply for the robot controller 10 is turned off. Consequently, there is no need to reprogram the teaching pendant 20 each time the control power supply is turned on, and this is convenient.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A robot control apparatus comprising:
   an input/output device operable to communicate input/output signals with a robot;
   a teaching device operable to program an operation program for a robot, said teaching device comprising
      a plurality of first keys, each of said plurality of first keys operable to instruct the robot with a plurality of input/output controls through said input/output device, and
      at least one second key operable to initiate performance of a series of input/output controls after the series of input/output controls have been instructed by said plurality of first keys; and
   a controller operable to control the robot through said input/output device according to the input/output controls.

2. The robot control apparatus according to claim 1, further comprising an allocator which allocates the series of input/output controls to one of said at least one second key.

3. The robot control apparatus according to claim 1,
   wherein said teaching device further comprises a third key which permits operation of said input/output device, and
   wherein said controller is operable to perform the series of input/output controls only when one of said at least one second key is pressed at the same time as said third key while programming the operation program.

4. The robot control apparatus according to claim 1, wherein said teaching device further comprises:
   a storage device operable to store a character array allocated to one of said at least one second key; and
   a display device operable to display the character array when only said one of said at least one second key is pressed while programming the operation program.

5. The robot control apparatus according to claim 4, further comprising:
   a storage device operable to store data corresponding to the character array; and
   a cell operable to store the data correspondingly to the character array while a control power supply of said robot controller is turned off.

6. The robot control apparatus according to claim 5, further comprising an allocator operable to allocate one of a plurality of the series of input/output controls to one of said at least one second key.

7. The robot control apparatus according to claim 1,
   wherein said teaching device further comprises at least one lighting device corresponding to said at least one second key, respectively, and
   wherein said teaching device is operable to turn on one of said at least one lighting device when the series of input/output controls allocated to a corresponding one of said at least one second key is completed after said corresponding one of said at least one second key is pressed by a user.

8. The robot control apparatus according to claim 1, further comprising:
   a storage device operable to store data corresponding to the input/output controls allocated to one of said at least one second key; and
   a cell operable to store said data corresponding to the input/output controls allocated to said one of said at least one second key while a control power supply of said robot controller is turned off.

9. The robot control apparatus, according to claim 1, wherein said at least one second key comprises a plurality of second keys.

10. The robot control apparatus according to claim 9, wherein said teaching device further comprises:
   a third key operable to permit operation of said input/output device; and
   wherein said controller is operable to perform the series of input/output controls only when one of said plurality of second keys is pressed concurrently with said third key.

11. The robot control apparatus according to claim 9, wherein said teaching device further comprises:

a display device; and a storage device operable to store a character array corresponding to each second key of said plurality of second keys;

wherein said teaching device displays the character array corresponding to one of said plurality of second keys in said display device when only said one of said plurality of second keys is pressed.

12. The robot control apparatus according to claim 9, wherein said teaching device further comprises a plurality of lighting devices corresponding to said plurality of second keys, respectively, and wherein said teaching device is operable to turn on one of said plurality of lighting devices corresponding to a respective one of said plurality of second keys when one of the series of input/output controls corresponding to said respective one of said plurality of second keys is completed after said respective one of said plurality of second keys is pressed by the user while programming the operation program.

13. The robot control apparatus according to claim 1, wherein said teaching device further comprises:

a fourth key for allocating two series of input/output controls for one of said at least one second key; and at least one lighting device corresponding to said at least one second key, respectively;

wherein said controller is operable to execute a first series of the two series of input/output controls when said one of said at least one second key is pressed while the programming the operation program, and is operable to turn on a corresponding one of said at least one lighting device when execution of the first series is completed; and wherein said controller is operable to execute a second series of the two series when said one of at least one second key is pressed while said corresponding one of at least one lighting device is lighted, and is operable to turn off said corresponding one of at least one lighting device when execution of the second series is completed.

14. The robot control apparatus according to claim 13, further comprising:

a storage device which stores data corresponding to the two series of input/output controls; and a cell provided for backup of the data in said storage device while a control power supply of said robot controller is turned off.

\* \* \* \* \*